Patented Nov. 20, 1923.

1,474,542

UNITED STATES PATENT OFFICE.

KARL JOHAN MONRAD, OF LITTLE FALLS, NEW YORK, ASSIGNOR TO CHR. HANSEN'S LABORATORY, INC., OF LITTLE FALLS, NEW YORK, A CORPORATION OF NEW YORK.

COMPOSITION FOR PRODUCING A LACTIC FOOD OF ESPECIAL DIGESTIBILITY.

No Drawing.     Application filed January 9, 1923. Serial No. 611,638.

*To all whom it may concern:*

Be it known that I, KARL J. MONRAD, a citizen of the United States, residing at Little Falls, in the county of Herkimer and State of New York, have invented certain new and useful Improvements in a Composition for Producing a Latic Food of Especial Digestibility; and I do hereby declare the following to be a full, clear, and exact description of the same.

This invention relates to a composition of matter which is a mixture to be added to milk or cream for the purpose of producing a food product of especial digestibility suitable for invalids or persons not easily digesting the casein of milk. The object of the present invention is to produce a dry compound which may be mixed with raw or pasteurized milk or cream and form therefrom a pudding, dessert, or ice cream, of especial digestibility with no other preparation than a slight warming of the milk and the stirring of the milk for a very brief period of time as the dry powder is added.

For many years it has been well known that rennet either in dry or liquid form may be mixed with milk to coagulate it so that the resulting food product may after sweetening and flavoring be eaten with a spoon. The present invention does not relate in any way to a mixture containing rennet but is directed solely to the improvement which consists in using in the composition a vigorous agent such as pepsin which not only curdles milk under proper conditions, but is preeminently a proteolytic enzyme for digesting protein; this new composition of matter therefore being of much greater value than previously known compositions in that it renders milk foods, whether formed from raw or pasteurized milk, easily assimilable by invalids or persons in general not capable of readily digesting the casein of milk.

The quantities or proportions of the various ingredients in the composition forming the subject matter of the present invention may naturally be varied to a considerable degree with respect to flavoring and sugar so as to suit various different tastes and circumstances.

In its most complete form the composition for producing lactic food of digestibility includes in addition to pepsin, sugar and a flavor ingredient, such other important but not absolutely essential ingredients as a gelatinous or gummy substance to prevent volatilization of the flavoring ingredient, a calcium salt, preferably the hypophosphite to insure more rapid action of the pepsin, and coloring matter having no other function than to please the eye.

The pepsin, as stated, is used not only to coagulate the milk to form a pudding but also to aid in the proteolytic digesting of the casein. The sugar is preferably granulated cane sugar and is used not only to sweeten the pudding, but to dilute the pepsin to such an extent as to avoid all danger of unevenly coagulating the milk when the dry powder is added to the milk. The flavoring ingredient may be either volatile such as the usual vanilla, raspberry, lemon, and orange flavoring extracts, or may be of more stable compounds, such for example, as chocolate, coffee, or caramel flavors.

The gelatinous or gummy substance is for the purpose of binding the volatile oil of the flavoring ingredients which if they were simply mixed with the finely ground sugar might evaporate to such an extent as to cause the mixture to loose a very appreciable amount of its flavor in the drying operation and also in storage, this gum obviously being omitted when such non-volatile flavors as chocolate or cocoa are used.

The soluble calcium salt such as calcium hypophosphite is used to lessen the time required for the pepsin to curdle the milk and it is especially important to include this element in sweet fresh raw milk which requires a considerable time to curdle if the pepsin were used alone. In addition the calcium salt, as is well known in the art, restores to pasteurized milk the property of being curdled quickly by the pepsin.

The coloring matter is quite optional and is added for the sole purpose of producing a tint pleasing to the eye in the finished pudding when the mixture is added to the milk, for example, a yellow-red dye for the orange, a pink tint for raspberry, which colorings the public has long been taught to expect of these flavors, although never actually existing in uncolored absolutely pure products.

Merely as illustrative of the method of making the dry composition the usual practice of making an orange flavored compound is as follows: Approximately 68 grams of dry gum tragacanth is soaked in sufficient water to make a smooth paste and then approximately 42 grams of terpeneless oil of orange is added and the compound thoroughly mixed preferably in an emulsifier. When this step in the process is entirely completed the mixture is added to and thoroughly mixed with approximately 45 kilograms (100 pounds) of granulated sugar and then the whole mixture is dried at a low temperature preferably below 50° C. (120° F.) When thoroughly dried the mixture is ground to a suitable fineness and to it is added about 50 grams of 1:3000 pepsin and about 180 grams of calcium hypophosphite.

While I have given the above process in full, it should particularly be borne in mind that it is merely a typical example, and it is absolutely immaterial as far as the present invention is concerned what particular flavoring is used, the invention residing particularly in the use of a dry mixture containing pepsin which will coagulate milk and produce a lactic food of especially digestibility. The dry composition prepared as above or similarly with variations depending upon circumstances is sold in containers of any preferred type and is used by adding the powder directly to lukewarm milk in the proportion for example of about 90 grams to a quart of the fluid, and produces a lactic food of especial digestibility due to the fact that pepsin is especially a proteolytic enzyme. At the time of mixing the powder and milk the milk should be stirred quite vigorously for a period of say half a minute in order to thoroughly incorporate the powder into the milk which is then allowed to rest until it becomes curdled or thickened into a pudding or into material suitable for freezing into an ice cream mixture. The latter is particularly advantageous in that owing to the use of the pepsin the food product is much more easily digested and assimilated by persons of weak digestive ability.

What is claimed is:

1. A dry composition for producing a lactic food of especial digestibility, comprising suitably ground and thoroughly mixed sugar and pepsin in the approximate proportion by weight of one part pepsin to a thousand parts of sugar.

2. A dry composition for producing a lactic food of especial digestibility, comprising suitably ground sugar, flavoring matter, pepsin, and calcium hypophosphite.

3. A dry composition for producing a lactic food of especial digestibility, comprising suitably ground sugar, flavoring matter, pepsin, and a soluble calcium salt.

4. A dry composition for producing a lactic food of especial digestibility, comprising suitable ground granulated sugar, a volatile flavoring substance, a gum, a soluble inorganic calcium salt and pepsin.

5. A dry composition for producing a lactic food of especial digestibility, comprising suitably ground and thoroughly mixed granulated sugar, pepsin and calcium hypophosphite in approximate proportion by weight of 100 pounds of granulated sugar, 50 grams of pepsin and 180 grams of calcium hypophosphite, and containing in addition a flavoring ingredient; the dry composition forming a curdling compound which may be mixed in a dry state with milk and which will act as a vigorous agent for the digesting of the casein of the milk after the food product has been eaten.

KARL JOHAN MONRAD.